(12) United States Patent
Bencic

(10) Patent No.: US 8,936,395 B1
(45) Date of Patent: Jan. 20, 2015

(54) SURFACE TEMPERATURE MEASUREMENT USING HEMATITE COATING

(75) Inventor: Timothy J Bencic, Highland Hts., OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/247,601

(22) Filed: Sep. 28, 2011

(51) Int. Cl.
*G01K 11/00* (2006.01)

(52) U.S. Cl.
USPC .................................................. 374/162

(58) Field of Classification Search
USPC ......... 374/120, 121, 129, 130, 131, 161, 152, 374/127, 141, 124, 166, 167; 356/43
See application file for complete search history.

(56) References Cited

U.S. PATENT DOCUMENTS

| 1,924,793 | A | 8/1933 | Laske |
| 4,105,583 | A | 8/1978 | Glover et al. |
| 4,228,761 | A | 10/1980 | Glover et al. |
| 4,278,349 | A | 7/1981 | Sander |
| 4,463,051 | A | 7/1984 | Berndt |
| 4,722,510 | A | 2/1988 | Kobayashi et al. |
| 5,340,537 | A | 8/1994 | Barrett |
| 5,499,597 | A | 3/1996 | Kronberg |
| 6,551,693 | B1 | 4/2003 | Buffard et al. |
| 2010/0128254 | A1* | 5/2010 | Nisper et al. .................. 356/45 |
| 2010/0272608 | A1* | 10/2010 | Penterman et al. ............. 422/69 |

* cited by examiner

*Primary Examiner* — Lisa Caputo
*Assistant Examiner* — Brandi N Hopkins
(74) *Attorney, Agent, or Firm* — Robert H. Earp, III

(57) ABSTRACT

Systems and methods that are capable of measuring temperature via spectrophotometry principles are discussed herein. These systems and methods are based on the temperature dependence of the reflection spectrum of hematite. Light reflected from these sensors can be measured to determine a temperature, based on changes in the reflection spectrum discussed herein.

20 Claims, 19 Drawing Sheets

SURFACE TEMPERATURE MEASUREMENT USING HEMATITE COATING

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND

Optical temperature sensing is crucial to many applications, especially where other methods of temperature sensing are unsuited, such as those involving high electric or magnetic fields, etc. Optical temperature sensing includes a number of techniques, such as pyrometry and luminescence techniques. However, conventional systems suffer from a lack of sensitivity across the full scale range, either having a low sensitivity at lower temperatures or a drop off in usable range at higher temperatures. Conventional systems utilize a filtered select short wavelength light to excite the thermal responsive coating, limiting the choices of light sources to excite the coating, and causing the systems to be sensitive to noise from background lighting.

The current state of the art uses luminescent dyes or phosphors to measure global surface temperature, a technique commonly referred to as the Temperature-Sensitive Paint (TSP) technique. Short wavelength light sources—either UV, violet (~400 nm) or blue (~460 nm)—are used to excite the luminescent material. The emitted light shifts to longer wavelengths which can be detected using a spectral filter that eliminates the excitation light from the detector. Additionally, temperature indicating paints capture peak temperature achieved through an irreversible color change after several minutes at that condition. These color changes are predetermined thermal bands that register the peak temperature if the peak temperature falls within the band.

The disadvantages of these luminescent sensors are the use of the filtered excitation light and the high cost and complexity of the detection systems. Generating high intensity stable short wavelength light for excitation is costly and limited to dark areas where background light becomes a potential error source or where the luminescent signal intensity must overcome the background. However, high intensity short wavelength excitation light tends to cause degrading of the emitted light over time.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods capable of measuring temperature. In accordance with these aspects, an example system can include a hematite temperature sensor, and a measurement component that can receive reflected light from the hematite temperature sensor and measures intensity data associated with at least a portion of a spectrum of the reflected light. Additionally, such a system can include an analysis component that determines a temperature of the hematite temperature sensor based at least in part on the measured intensity data.

In other aspects, the innovation can comprise a method of producing a temperature sensor. Such a method can include the acts of mixing a refractory binder with hematite particles to create a coating, applying the coating to a surface, and curing the coating by raising the temperature of the coating.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
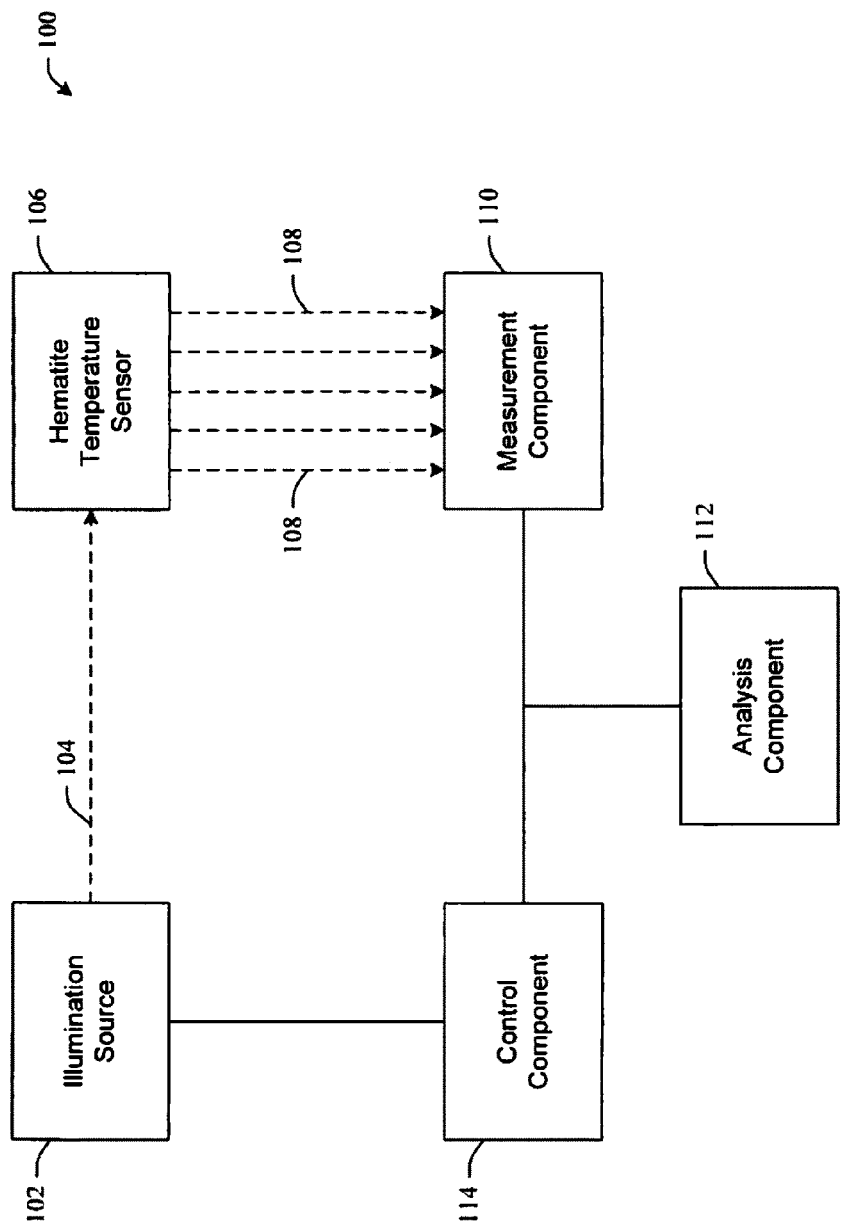
FIG. 1 shows a system capable of optical measurement of temperature in accordance with aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

In aspects, the innovation includes a temperature sensitive coating sensor based on hematite (Iron III oxide) that can be used to measure surface temperature using spectral techniques. Hematite powder can be added to a binder in order to allows the mixture to be painted on the surface of an object of interest, such as a component, test specimen, etc. Coatings discussed herein can dynamically change their relative spectral makeup or color with changes in temperature. The color changes from a reddish brown appearance at room temperature (25° C.) to a black-gray appearance at temperatures around 600° C. The color change is reversible and repeatable with temperature cycling from low to high and back to low temperatures. Detection of the spectral changes can be recorded by different sensors as explained herein, including spectrometers, photodiodes, cameras, etc. Using a priori information obtained through calibration experiments in known thermal environments, the color change can be calibrated to yield accurate quantitative temperature information. Temperature information can be obtained at a point or over an entire surface depending on the type of equipment used for data acquisition.

In various embodiments, the subject innovation includes thermal measurement systems and methods capable of temperatures of at least 600° C. These embodiments can be used to determine temperatures of components and test specimens in a variety of applications, such as in high speed test facilities to measure aerothermodynamic heating, in commercial applications, industrial applications, etc. These embodiments are capable of uniform sensitivity across a large temperature range using full field surface measurement techniques. Thermal measurements in accordance with the subject innovation is accurate and not influenced by complex geometric shapes that are typical in many applications (e.g., aerospace testing, etc.). Further, systems and methods of the subject innovation are non-intrusive, while being relatively easily implemented into various test facilities. Measurements of the subject innovation are dynamic, repeatable and can accurately represent thermal variations on surfaces (e.g., due to aerodynamic heating on a surface, etc.).

Turning to FIG. 1, shown is a system 100 capable of optical measurement of temperature in accordance with aspects of the subject innovation. System 100 can comprise an illumination source 102 that can produce incident light 104 capable of illuminating a hematite temperature sensor 106 (sometimes referred to as sensor 106 or temperature sensor 106) of the subject innovation. In some embodiments, illumination source 102 can be a light emitting diodes (LEDs) (e.g., a red-orange LED, etc.), halogen lamp, arc lamp (e.g., a hydrargyrum medium-arc iodide (HMI) lamp, etc.), or other sources (e.g., filament, flashtubes, fluorescent lamps, other light sources, etc.) can also be used. In other embodiments, however, incident light 104 can be obtained from environmental light sources (e.g., sunlight, etc.), and in such embodiments illumination source 102 need not be included in system 100. Alternatively, system 100 can be configured to use an environmental light source at some times, and illumination source 102 at other times (e.g., when there is insufficient environmental light, etc.), which can reduce power consumption, etc. Additionally, in some aspects, more than one illumination source 102 can be used, for example when temperature measurements are desired for multiple surfaces of a component, etc.

Hematite temperature sensor 106 can be a coating (e.g., a mixture of hematite and a binder, etc.) applied to substantially any surface that temperature measurements are to be taken of, or can be a fiber optic probe coated in hematite (e.g., mixed with an appropriate binder, cured if necessary, etc.) that can be used to measure the temperature near the probe. Hematite temperature sensor 106 can reflect at least a portion of incident light 104 as reflected light 108. Based on the optical absorption of hematite temperature sensor 106, the spectrum of reflected light 108 will vary. As described in greater detail herein, the optical absorption of hematite varies predictably with temperature, thus the spectrum of reflected light 108 will vary based on the temperature of sensor 106, and can be used to determine the temperature of sensor 106. Additionally, in many situations, the temperature of sensor 106 may vary from location to location across the surface of sensor 106, thus the spectrum of portions of reflected light 108 can vary based on the location on the surface of hematite temperature sensor 106 from which that portion of reflected light 108 originates. The spectrum of the reflected light 108 can depend on a number of factors as described herein, such as choice of illumination source 102 (or ambient or environmental lighting, etc.), temperature, size, and shape of hematite particles in sensor 106, etc. In embodiments involving a hematite-based coating on a fiber optic probe, both the incident light 104 and the reflected light 108 can be transmitted by the fiber optics.

Sensor 106 can comprise a temperature sensitive coating that can be used to make measurements of temperatures in a range from around 25° C. or less to around 600° C. or more. The coating can allow full-field temperature measurements by the use of imaging techniques and any of a variety of types of illumination (e.g., white light, colored light, etc.). The coating can utilize hematite or iron (III) oxide particles with a relatively small mean diameter embedded in a high temperature binder (e.g., high temperature, smooth and flat refractory binders, etc.). For example, in some aspects, the binder can be a silicone-ceramic based high temperature clear binder thinned with lacquer thinner, that becomes very dull when heated to >500° C. In embodiments, hematite particles can be incorporated or embedded in a refractory binder that can be painted onto a surface and can be cured to create a temperature sensor such as sensor 106. The color of sensor 106 depends at least in part on the size, shape, and temperature of the hematite particles. For example, for some particle sizes (e.g., around 5 µm or less, etc.), color changes as a result of temperature is reversible, with the particles returning to the original color after heating and subsequent re-cooling. For some other particle sizes, however (e.g., around 50 nm or less, etc.), the particles do not necessarily return to the original color after heating and re-cooling (however, such coatings can be used as temperature sensitive coatings to ascertain a maximum temperature a sample is subjected to). In various aspects, these binders can be thermally conductive or insulating depending on the fillers used with the hematite. Depending on the geometry of the sensor, use of a flat, minimally reflective binder can improve measurement accuracy, such as in situations where reflections from the illumination source can cause errors in the detected surface temperature. A variety of binders have been tested as described further herein, and several candidate refractory binders provide high accuracy, even on curved surfaces.

The hematite coating of sensor 106 can use spectrophotometry principles (i.e., change in color) of operation, as opposed to conventional methods, which use photoluminescence principles. The reflectance of the coating is nearly constant below 550 nm and varies significantly with temperature at longer wavelength (e.g., greater than 575 nm) with a peak at approximately 620 nm at 25° C., thus yielding its red color. As the temperature rises, the peak shifts to longer wavelength and decreases in intensity. The temperature dependence of the reflectance suggests that this phenomenon can be explained by a change in the band gap absorption edges of semiconductors.

Measurement component 110 can detect at least a portion of reflected light 108, and, in some aspects, can measure two or more portions associated with different locations of sensor 106, for example, to obtain measurements associated with a map of the surface, etc. Because the hematite coating of sensor 106 can use spectrophotometry principles (i.e., change in color) of operation, measurement component 110 can comprise any of a number of imaging devices, such as CCDs (charge-coupled devices) and devices incorporating CCDs, including CCD cameras; single lens reflex (SLR) cameras (digital or analog); active-pixel sensors (APSs) and devices incorporating APSs, such as an APS camera or complementary metal-oxide-semiconductor (CMOS) cameras; monochrome or color cameras; as well as other devices. In aspects, measurement component 110 can comprise a spectrometer for collecting spectral information. Optionally, measurement component 110 can comprise more than one imaging device to detect reflected light 108 from more than one region of sensor 106. Additionally, in some aspects, measurement component 110 can measure a level of ambient or environmental light, which can be used for a variety of purposes, such as to determine whether illumination source 102 is necessary, to calibrate measurements based on the level of ambient or environmental light, etc. Optionally, one or more filters (e.g., a bandpass filter, etc.) can be used in connection with measurement component 110 to receive data from a portion of the spectrum of interest, and can be selected to minimize noise such as thermal noise, etc. Additionally or alternatively, filtering may optionally be used with illumination source 102 to alter the spectrum of incident light 104. In various embodiments, additional optics may be used with either measurement device 110 or illumination source 102 for a variety of reasons as required and as understood in the art, such as to redirect, collimate, filter, focus, split, etc. either incident light 104, reflected light 108, or both. In various aspects, measurement component 110 can obtain one or more values from hematite temperature sensor 106 (e.g., in fiber optic embodiments discussed herein, or in certain applications of other embodiments), so as to obtain a single temperature value of sensor 106, or to obtain multiple values so as to determine a map of the temperature of hematite temperature sensor 106. Depending on the requirements, multiple imaging devices can be used to obtain information associated with multiple surfaces of a component or from multiple angles of a region of interest. In aspects, measurement data can be obtained and analysis performed on it in real-time.

Analysis component 112 can receive spectral data from measurement component 110 and determine temperature based at least in part on the spectral data, which can be based on at least a portion of the reflected light 108. Spectral data received by analysis component can include, for example, intensity data for at least a portion of the spectrum of reflected light 108. The temperature can be determined based on comparing the intensity of a portion of the spectrum to a reference intensity, such as the intensity of that portion of the spectrum at a known temperature (e.g., room temperature, etc.). Additionally or alternatively, the spectral data can be used in a variety of other ways to determine the temperature, such as the intensity of one or more portions of the spectral data (including ratios of two or more portions), the wavelength of a peak, curve fitting to one or more reference intensity distributions, etc. For measurements corresponding to more than one region (e.g., different regions subdividing a surface, such as by a grid, etc.), spectral data can be analyzed for each region. Analysis component can compare the spectral data to one or more calibration values that correlate spectral data to temperature when measured under controlled conditions, which can be determined by calibrating a system of the subject innovation with a reference thermometer (e.g., a thermocouple, infrared thermometer, platinum resistance thermometer, etc.) to obtain correlations between the calibration values that correlate spectral data to temperature. For example, a measured intensity of a known portion of the spectrum can be compared to a reference intensity of that portion at a known temperature, and based on a known temperature dependence of that portion of the spectrum (e.g., based on measurements made in controlled circumstances, etc.), the temperature can be determined. In some aspects, regression analysis can be used to obtain a best fit between measured spectral data and one or more calibration values (e.g., least squares, etc.). In aspects, a known or measured intensity of illumination source 102 or ambient or environmental lighting can be used to better calibrate the measured spectral data before comparison with calibration values. Additionally, because of the relative ease of measurement, measurement, analysis, and determination of temperature can be performed in real time, and can be output in real-time, for example, as a video or image showing a temperature map of a component or region of interest in real-time.

Control component 114 can coordinate the operation of illumination source 102, measurement component 110, and analysis component 112. For example, illumination source 102 can illuminate sensor 106, and measurement component 110 can obtain spectral data of reflected light 108 for processing by analysis component 112. Control component 114 can then present this data in a variety of formats, providing temperature data over time. In embodiments involving temperature determinations over multiple regions, this data can be presented as a temperature map, for example, as a video of the temperature map over time. In some aspects, control component 114 can provide intensity data of illumination source 102 to analysis component 112 to obtain results calibrated based on the intensity of illumination source 102. In other aspects, control component 114 can determine, based on an intensity of ambient or environmental light, whether illumination source 102 should be used (including, in some embodiments, whether a relatively higher or lower intensity should be used), or whether measurements should be obtained based on ambient or environmental light.

The hematite temperature sensitive coating of sensor 106 uses spectrophotometry principles (change in color) of operation rather than conventional methods, which use photoluminescence principles. This allows the use of white light for illumination rather than high intensity short wavelength excitation. The generation of high intensity white (or potentially filtered long wavelength light) is much easier and is used more prevalently for photography and video technologies. In outdoor tests, the sun can be used for short durations as an illumination source as long as the amplitude remains relatively constant. For longer periods of times, if the amplitude varies relatively slowly, periodic recalibration based on the amplitude can be used to obtain relatively accurate results. Reflected light 108 is also much higher in intensity than the emitted light from the inefficient conventional methods. Having a much brighter surface allows a wider array of cheaper detection schemes and devices. Since color change is the principle of operation, the development of high quality lower cost digital cameras can be used for detection, as opposed to the high cost imaging devices needed for intensity measurements with conventional methods.

In view of the aspects and features described, methodologies that may be implemented in accordance with embodiments of the subject innovation will be better appreciated with reference to the figures. While for purposes of simplicity of explanation, the methodologies are shown and described as a series of drawings representing steps or acts associated with the methodologies, it is to be understood and appreciated that the claimed subject matter is not limited by the order of the drawings, as some drawings may occur concurrently with other drawings and/or in different orders than what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated drawings may be required to implement the methodologies described hereinafter.

There are a significant number of potential alternate applications and detection methods for systems and methods of the subject innovation. The hematite sensor can be applied to the end of an optical fiber or clear optical element, or can be mixed in to protective coatings or paints that allow consumers or operators to have an indication of elevated temperatures. Detection sensors can be single or multipoint photosensors, for example, photodiodes, photoresistors, charge coupled devices and optical systems such as spectrometers, color sensors, the human eye, etc. Analysis methods can vary depending on the application, but may consist of interrogation of specific spectral regions for intensity change or the usage of multiple spectral regions, for example, intensity changes in the blue and red color bands, etc. For example, the measurement of brightness change due to absorption or reflection changes of the hematite sensor could be used. When illuminated with a light source, temperature can be detected by an imaging device or detection sensor as described herein. The reflected light from the coated surface can be an indication of the temperature dimming with elevated temperature, which can be analyzed and interpreted as described herein. Optical systems and methods such as those of the subject innovation are especially relevant in harsh environments such as high electric or magnetic fields.

Figure 2:
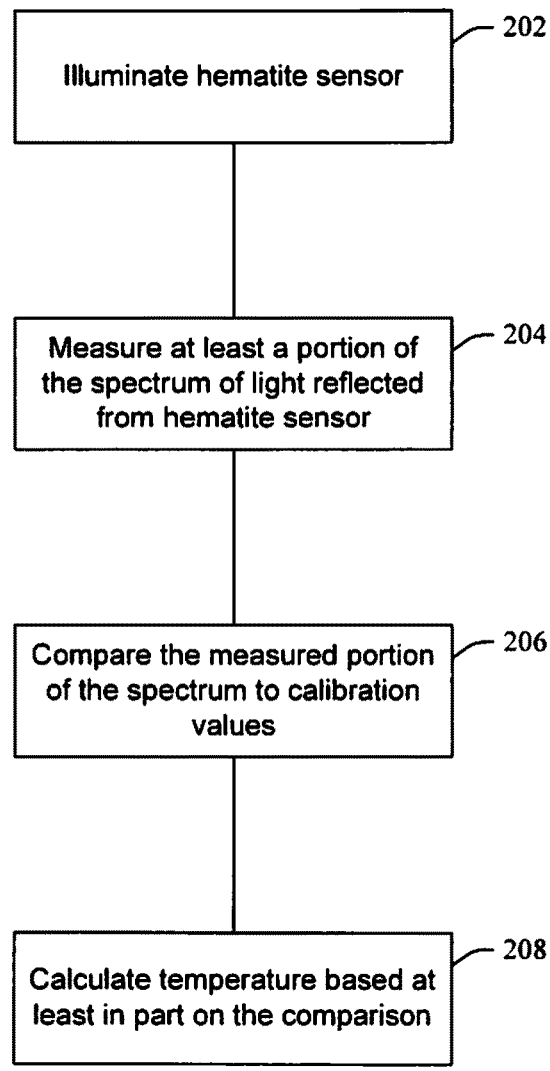
FIG. 2 illustrates a method of measuring temperature in accordance with the subject innovation.

Turning to FIG. 2, illustrated is a method of measuring temperature in accordance with the subject innovation. At step 202, a hematite sensor (e.g., a sensor such as sensor 106, etc.) can be illuminated with incident light. In various embodiments, environmental light (e.g., the sun, etc.) can be used, or a light source (e.g., such as those described herein) can be used. Based on the temperature of the hematite sensor, its reflectance will vary in a way measurable from the light reflected by the hematite sensor. At step 204, at least a portion of the spectrum of light reflected from the hematite sensor can be measured. This measurement can be obtained by substantially any imaging device described herein (e.g., a camera, etc.). The measured portion of the spectrum can be compared to one or more calibration values at step 206, to obtain a best fit or closest match among calibration values. Based at least in part on the comparison, one or more temperatures can be calculated at step 208. In some embodiments, as described elsewhere herein, multiple simultaneous measurements can be taken over a surface, so as to obtain a temperature map of the surface. Additionally, measurements can be taken repeatedly over time and temperatures calculated in real-time, in order to provide a real-time indication (or map, etc.), of the temperature of the hematite sensor.

Figure 3:
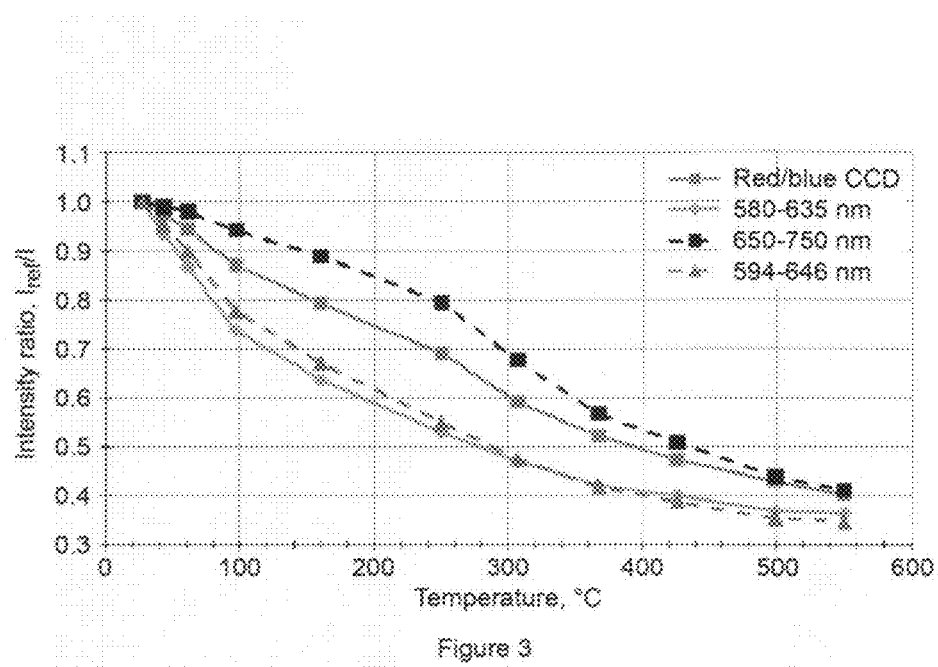
FIG. 3 illustrates calibration results of temperature against intensity for four different spectral regions.
Figure 4:
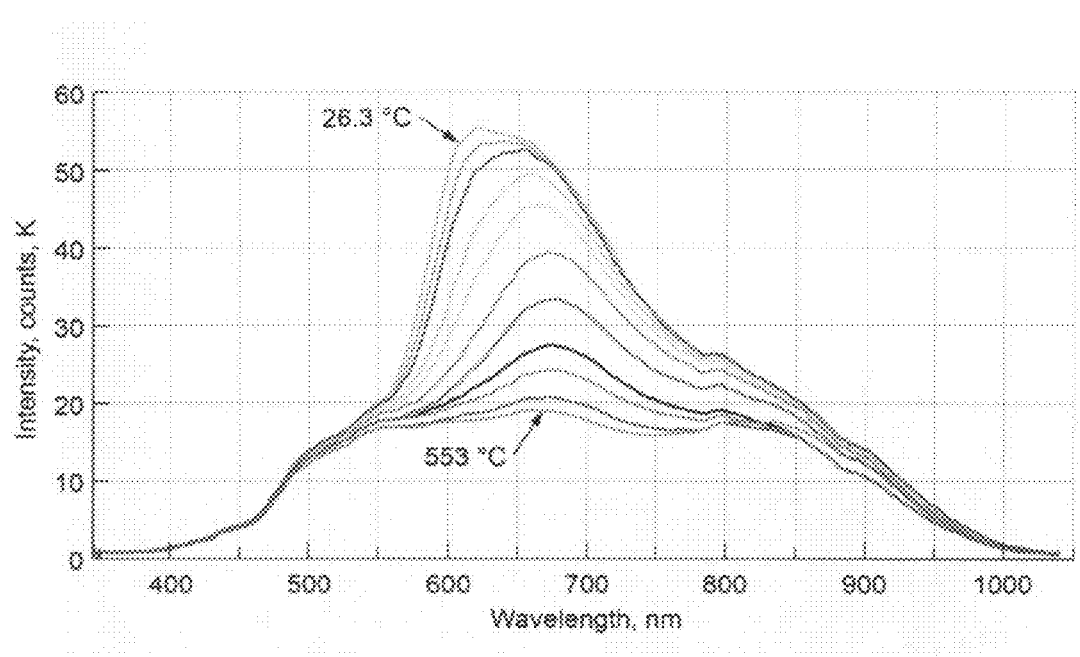
FIG. 4 shows hematite spectra at various temperatures.

Additional or alternative methods of detection and analysis are possible to increase the measurement sensitivity. For example, a monochrome camera can be used with an appropriate filter and a radiometric measurement of normalized intensity change that is proportional to the change in coating temperature. Utilizing different spectral regions can yield different sensitivities and calibration curves for converting intensity change to temperature units. An example of this is shown in FIG. 3, which illustrates calibration results of temperature against intensity for four different spectral regions. Alternatively, using a color camera, a ratio of the standard red, green and blue outputs can be used as a self-referenced change. The sensitivity of the hematite coating can be tailored to the temperature range of interest or have a near linear sensitivity over a large temperature range. The Red/Blue CCD utilizes the sensitivity of the two colors of a CCD chip to have a self-referencing coating. The other curves use bandpass filters to limit the reflected light collection to select spectral regions. As shown in FIG. 4, which illustrates spectral response as a function of temperature for a hematite sensor using halogen illumination, the blue region (wavelengths less than around 500 nm) does not change nearly as much as the red region (wavelengths greater than around 575 nm), thus a ratio of color intensities will yield a calibrated temperature image. As can be seen in FIG. 4, the intensity decreases and peak shifts to longer wavelength as temperature increases.

Temperature sensor coatings of the subject innovation are easy to apply, inexpensive, can contour complex shape surfaces, and can be a global surface measurement system based on spectrophotometry. The color change or relative intensity change at different colors make the optical detection under white light illumination and associated interpretation easier to measure and interpret than in conventional detection systems and methods. Systems and methods disclosed herein are more robust than conventional systems, with a more linear response over the wider temperature range from around 25° C. or less to around 600° C. or more, and the sensitivity of the coating can be improved depending on the spectral acquisition regions under consideration, which can allow for more dynamic range in lower or higher temperature ranges.

As will be understood, systems and methods of the subject innovation employ sensors that have a near linear response over the temperature range of operation (from around 25° C. or below to around 600° C. and above), rather than conventional methods, which suffer from areas of high and minimal sensitivity, yielding data with varying accuracy, especially when the test article has a large temperature gradient or is operated over an extended temperature range.

What follows is a more detailed discussion of certain systems, methods, and apparatuses associated with aspects of the subject innovation. To aid in the understanding of aspects of the subject innovation, theoretical analysis and experimental results associated with specific experiments that were conducted are discussed herein. However, although for the purposes of obtaining the results discussed herein, specific choices were made as to the selection of various aspects of the experiments and associated setups—such as choice of illumination source, binder, imaging device, as well as other aspects—the systems and methods described herein can be employed in other contexts, as well. For example, aspects of the subject innovation can be utilized to determine the temperature over a surface, or one or more portions thereof. In another example, different selections of illumination spectrum, imaging device, or binder than those used in the experiments discussed herein, and may have differing characteristics, as explained in greater detail below.

Figure 5:
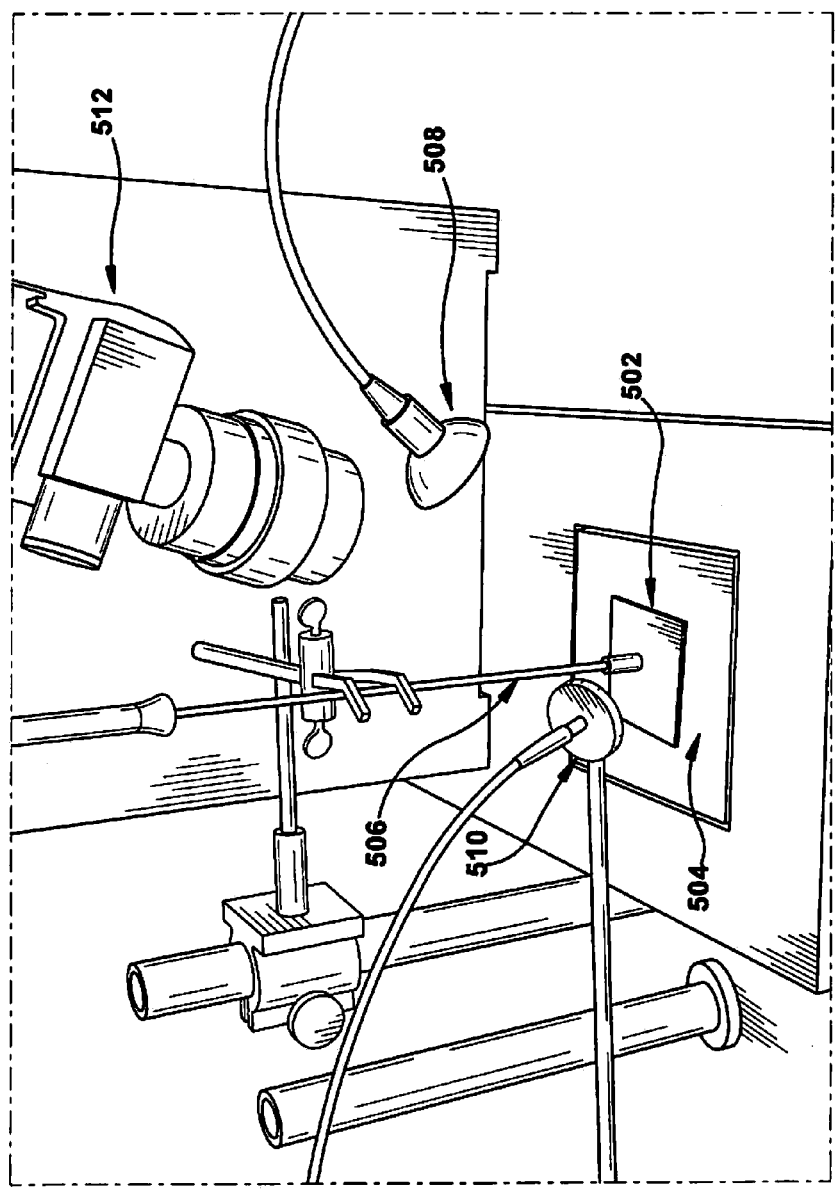
FIG. 5 illustrates an experimental setup used in a first experiment conducted herein.

In some experiments conducted herein, hematite-based sensors were used to make temperature measurements. FIG. 5 illustrates an experimental setup used in a first experiment conducted herein. Test samples 502 made of thin stainless steel were coated with a hematite-based temperature sensitive coating sensor (TSC sensor) and placed on a hotplate 504, which controlled the temperature of sample 502. Hematite particles were mixed in with a refractory binder and painted on the surface of sample 502. A thermocouple 506 contacting the sample 502 and infrared thermometer (not shown) were used as reference temperature measurements to compare with the optical data acquired. Uniform illumination of the sample was provided by a halogen light source 508 and optical detection was done using a fiber optic spectrometer 510 and single lens reflex (SLR) camera 512 to monitor color changes of the sample 502 by acquiring spectral information and images, respectively.

Figure 6:
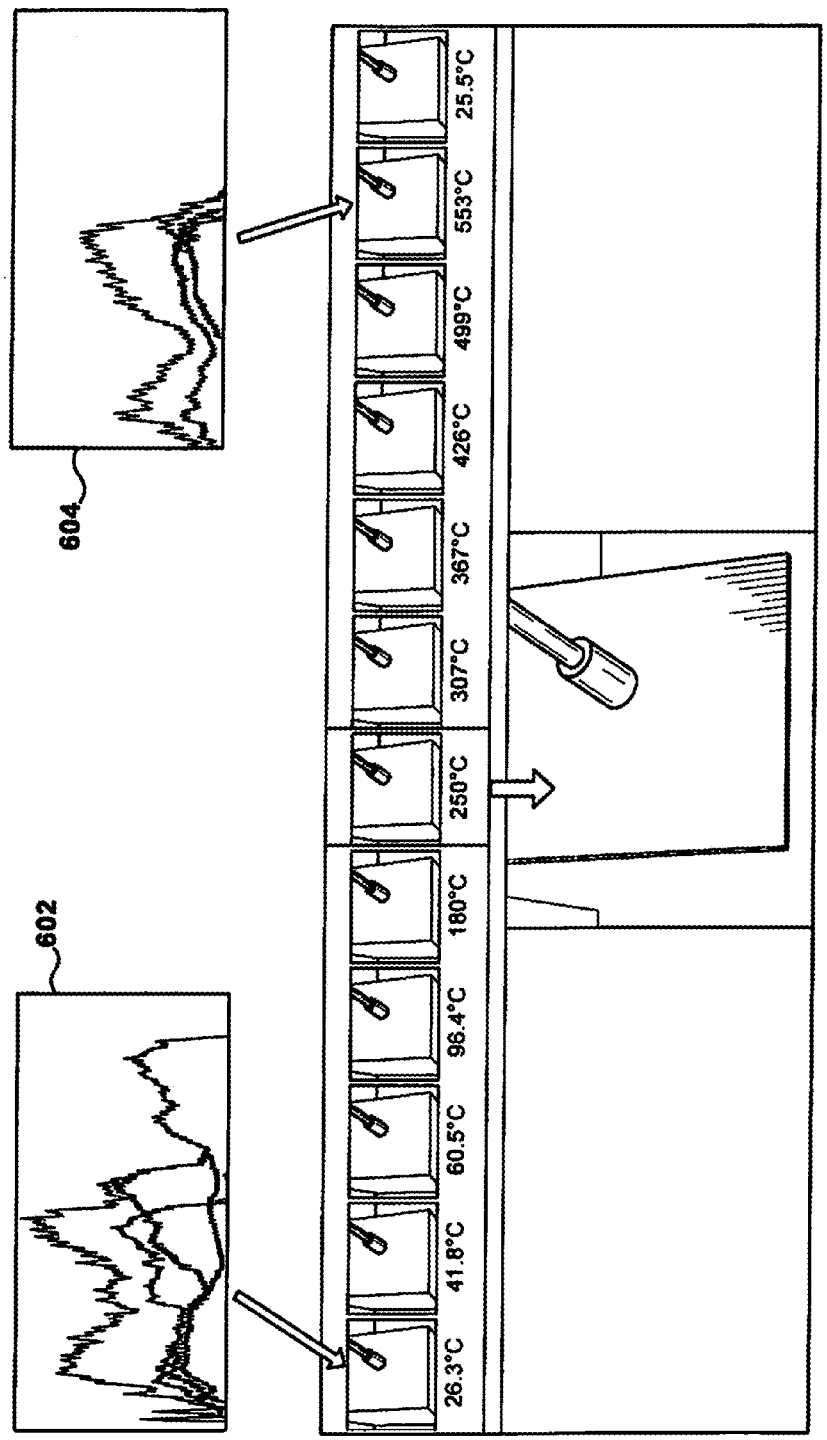
FIG. 6 shows images recorded of a change in hematite color as the temperature is increased and as the final temperature returns to ambient conditions.

Hotplate 504 was used to uniformly heat the TSC sample 502 and data were acquired as temperature was cycled from room temperature to 600° C. several times. Returning to FIG. 4, the spectral data acquired is shown, as measured by the spectrometer 510. FIG. 6 shows the images recorded by the SLR camera of the change in color as the temperature is increased and as the final temperature returns to ambient conditions. As can be seen in FIG. 6, photos of the hematite coated sample 502 showed the progression of color change from bright reddish-brown color to darkening gray color with increasing temperature from ambient to high temperature and back to ambient. Spectra 602 and 604 show spectra recorded at 26.3° C. and 553° C., respectively.

Figure 7:
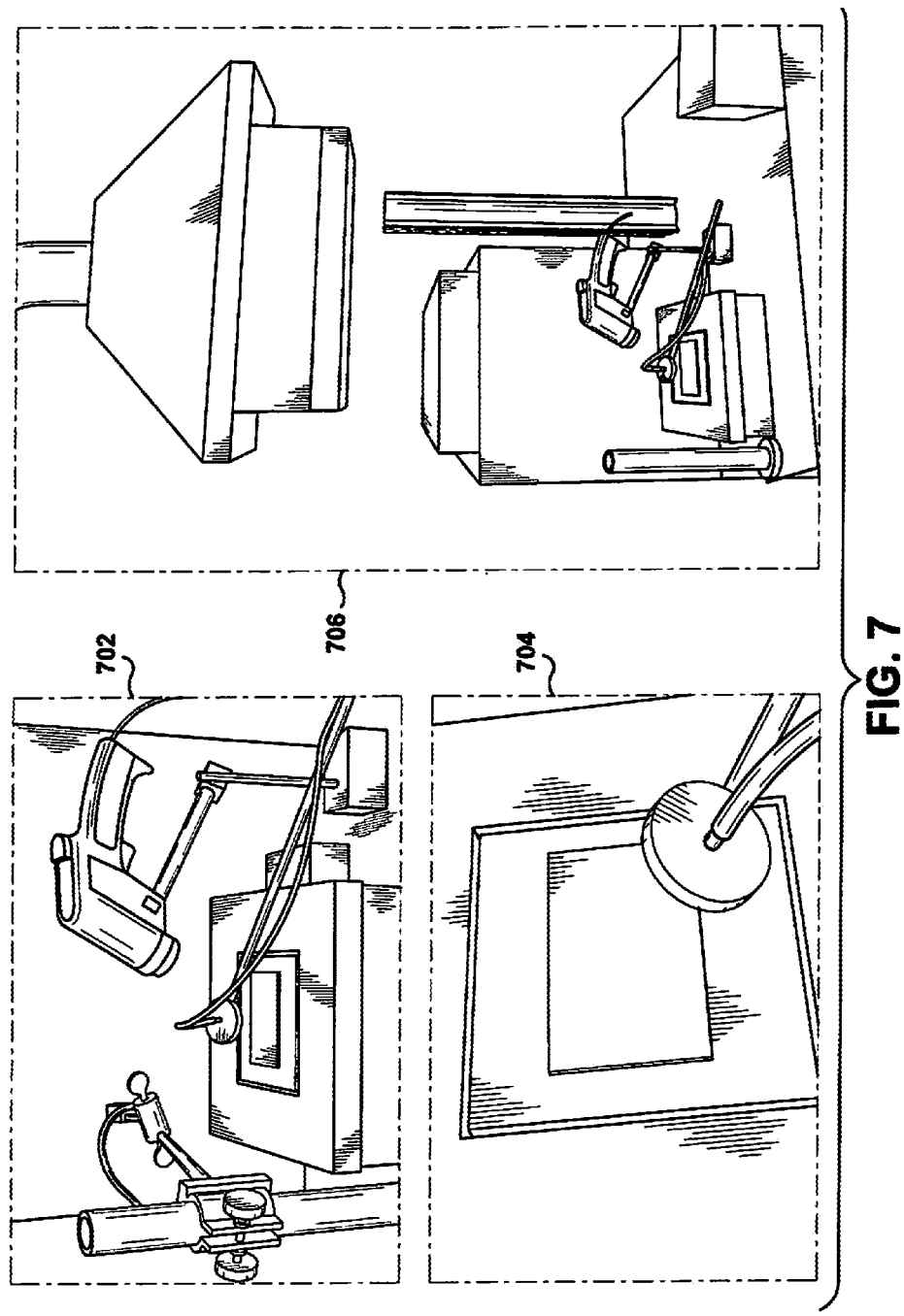
FIG. 7 illustrates an alternative test setup used to obtain experimental data discussed herein.
Figure 8:
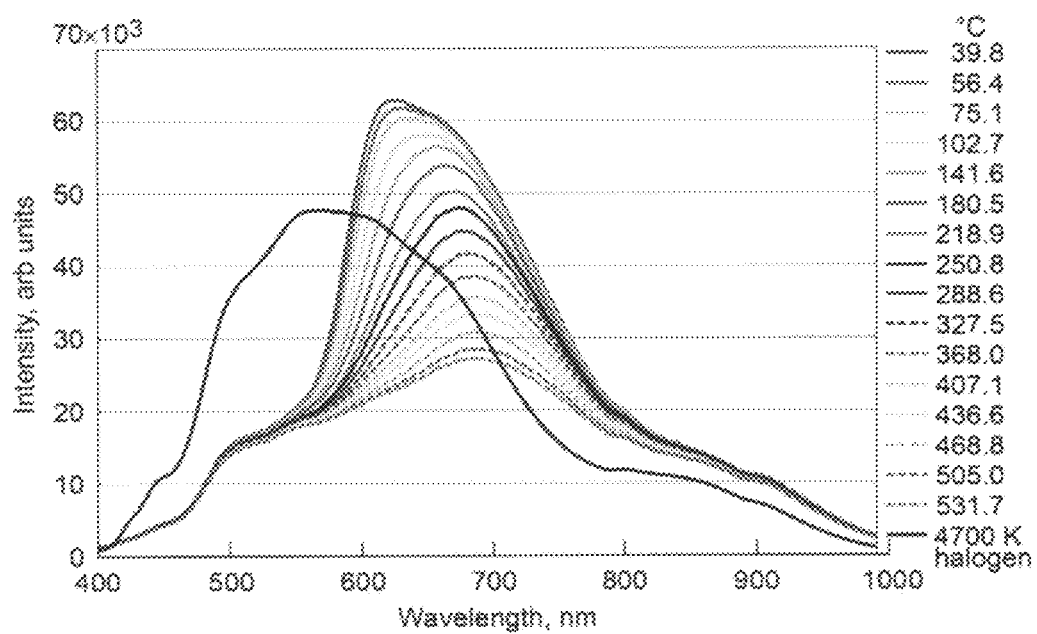
FIG. 8 shows the spectrum of a 4700K halogen lamp along with spectra of hematite sensors at a range of temperatures.

FIG. 7 illustrates an alternative test setup used to obtain experimental data discussed herein, in images 702, 704, and 706. Results obtained with the setup of FIG. 7 are illustrated in FIG. 8, which shows the spectrum of a 4700K halogen lamp along with spectra of hematite sensors at a range of temperatures.

Figure 9:
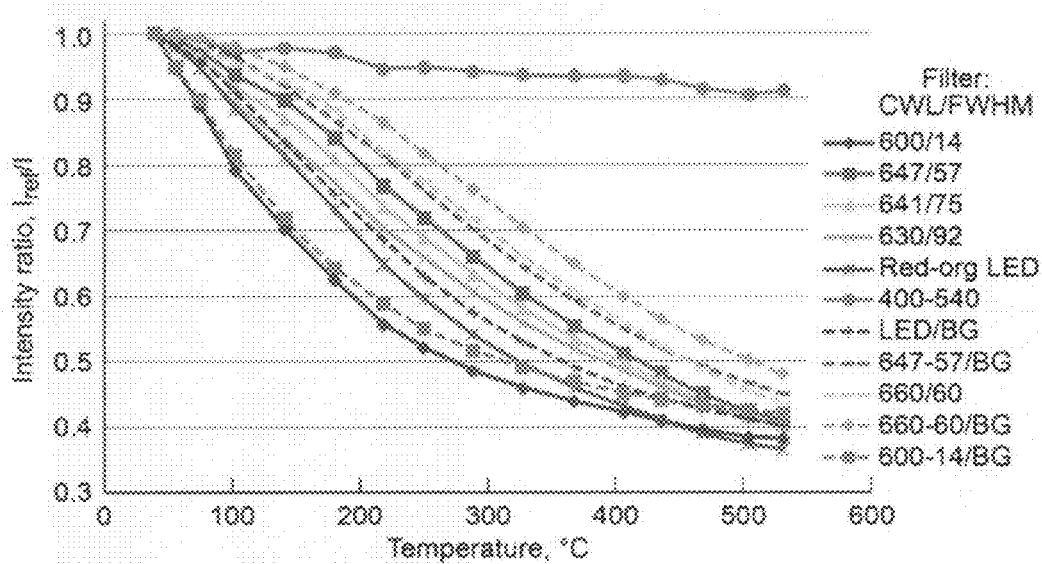
FIG. 9 shows a range of filter or color selections that can be employed with sensors of the subject innovation, and the resulting graphs of intensity as a function of temperature.

FIG. 9 shows a range of filter or color selections that can be employed with sensors of the subject innovation, and the resulting graphs of intensity as a function of temperature, indicating for each curve either a range of wavelengths, colors, or a center wavelength and full width at half maximum. As shown in FIG. 9, with appropriate selection of filters or colors, systems and methods of the subject innovation can be tailored to different temperature sensitivities at different ranges.

Figure 10:
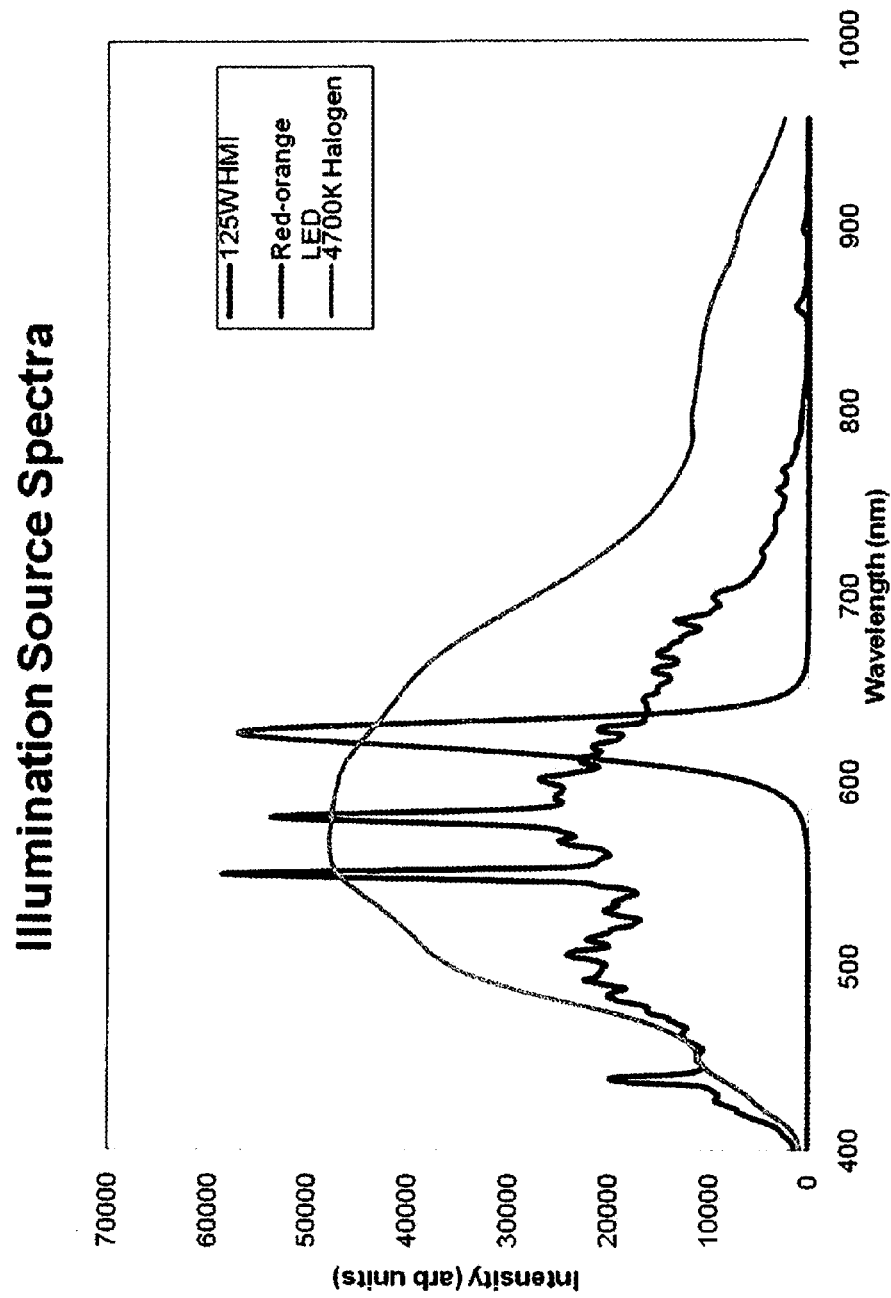
FIG. 10 illustrates spectra for three illumination sources used in experiments conducted herein.

Turning to FIG. 10, illustrated are spectra for a variety of illumination sources, showing spectra for three illumination sources used in experiments discussed herein: a 125 W HMI lamp, a red-orange LED, and a 4700K halogen lamp. Various illumination sources were used along with bandpass filters on monochrome cameras to obtain some of the results discussed herein.

Figure 11:
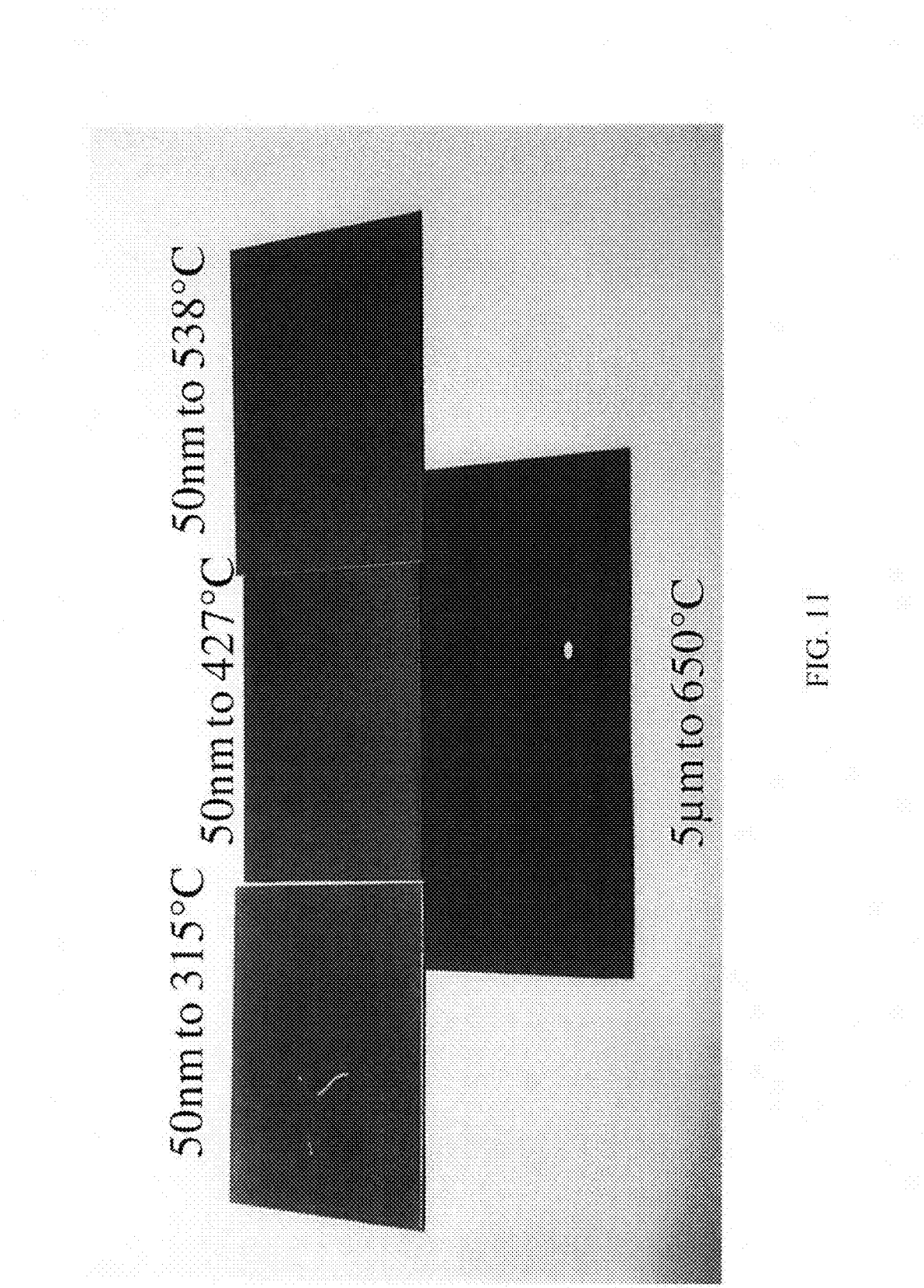
FIG. 11 illustrates that the temperature response of hematite sensors depends on the size of the hematite particles.

As explained above, temperature response of the hematite sensors discussed herein can depend on multiple factors, including the size, shape, and temperature of the hematite particles. FIG. 11 illustrates that the temperature response of hematite sensors depends on the size of the hematite particles. Larger particles, for example, around 5 μm in size, can return to the original color after heating to high temperature and being subsequently re-cooled. However, smaller particles, for example, around 50 nm in size, do not return to the original color when heated to lower temperatures than the around 5 μm particles.

Figure 12:
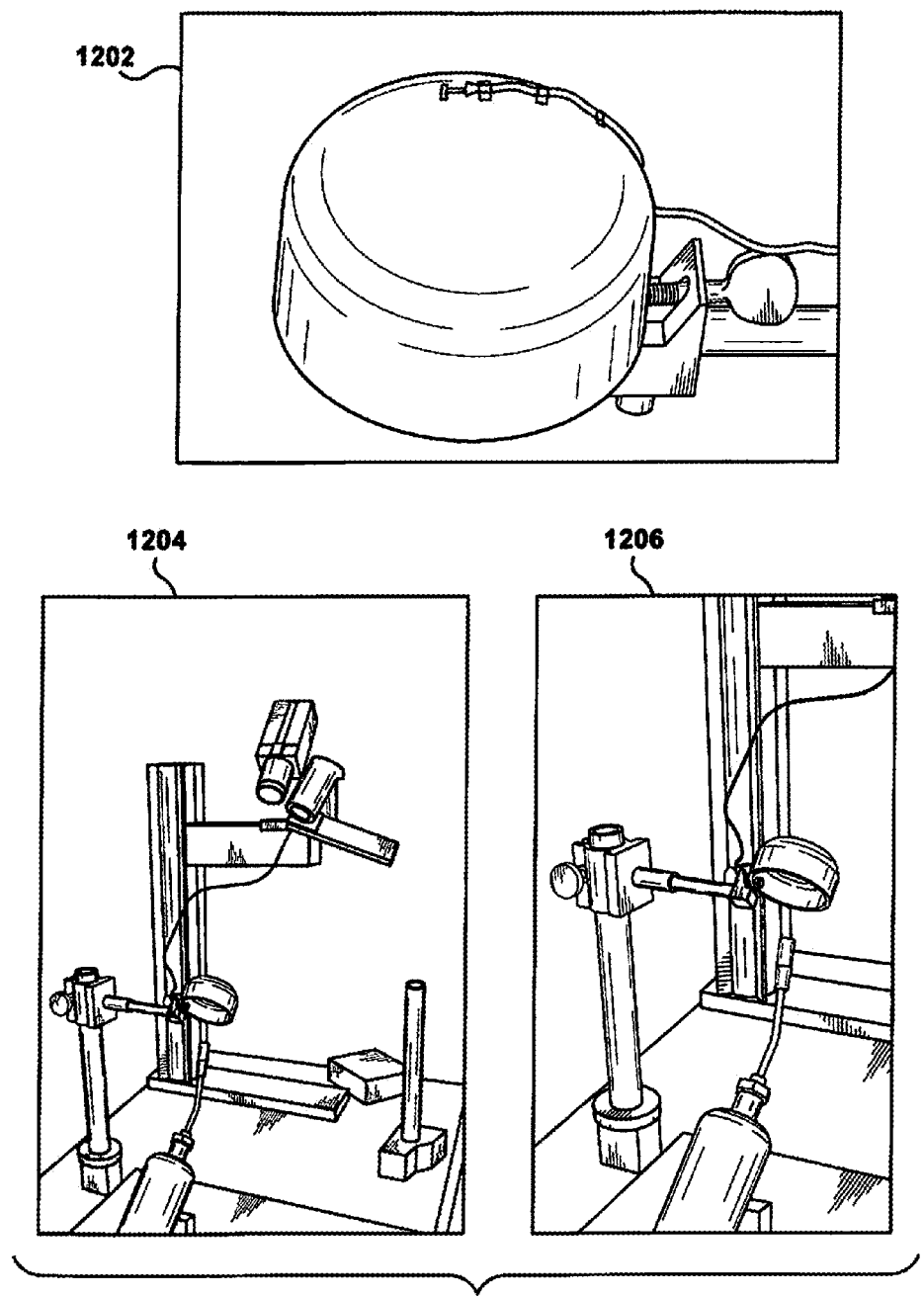
FIG. 12 illustrates a third experimental setup used to obtain results discussed herein.
Figure 13:
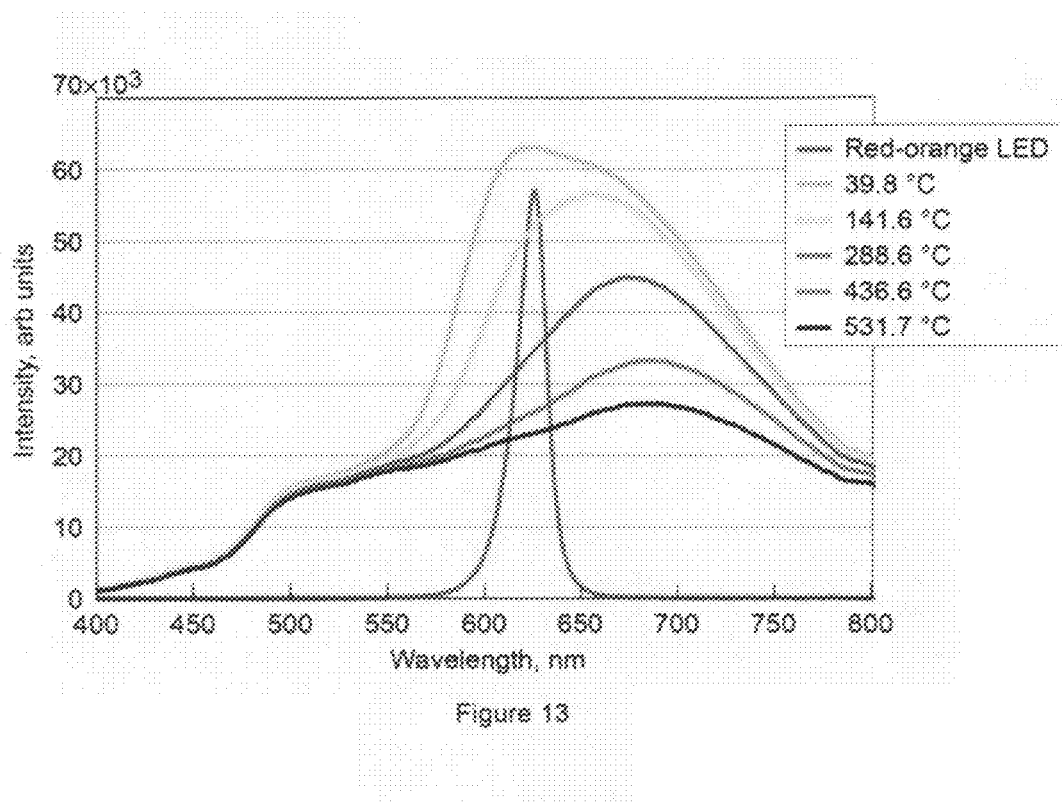
FIG. 13 shows a graph indicating the spectrum of a red-orange LED and the resulting spectra of the hematite-coated cap at a variety of temperatures.

FIG. 12 illustrates a third experimental setup used to obtain results discussed herein, in images 1202, 1204, and 1206. As seen in image 1202, the test sample was a type 304 stainless steel 3" pipe cap fitted with a calibrated type K thermocouple with 30 gage (0.010") glass braided insulation, a peened in surface, and strain relief straps. Hematite (of approximately 5 μm particle size) in a silicone-ceramic binder spray was applied to the surface using an automotive-type gravity feed touch-up spray gun, and subsequently cured to 550° C. A propane torch was used to heat the backside of the cap to produce a temperature gradient. Measurements were taken using both a tungsten halogen lamp and a 5 W red-orange LED as illumination sources, with either a cooled CCD camera, a digital SLR camera, or a high speed CMOS camera as imaging devices. FIG. 13 shows a graph indicating the spectrum of a red-orange LED and the resulting spectra of the hematite-coated cap at a variety of temperatures.

Figure 14:
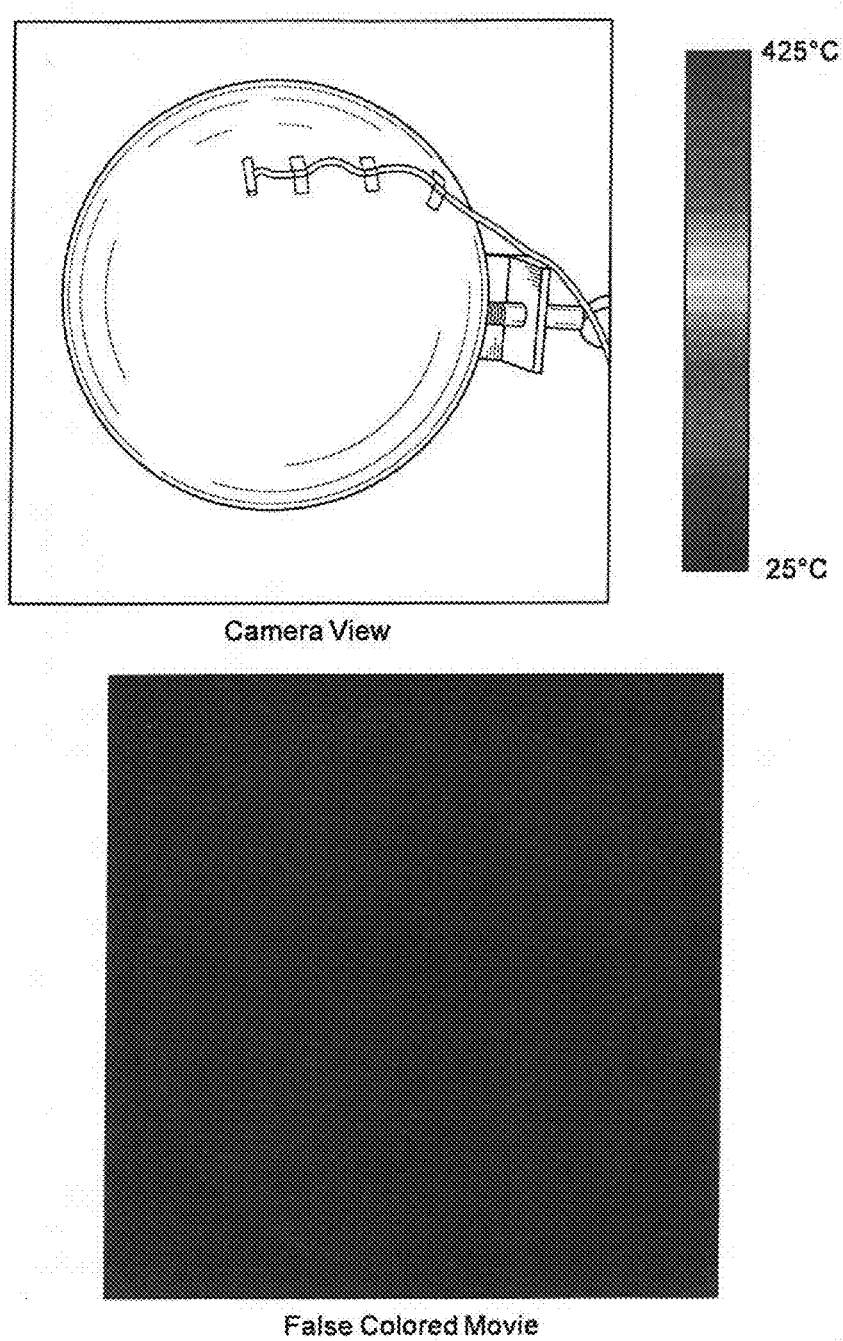
FIG. 14 illustrates results obtained with the setup of FIG. 12, from both a camera view and a false-colored movie.

FIG. 14 illustrates results obtained with the setup of FIG. 12, from both a camera view and a false-colored movie. The illumination source used was a focused 5 W red-orange LED, with detection by a cooled monochrome 14 bit camera, with a bandpass filter used to minimize stray light. The camera had a 50 mm lens, with an f-number of f/5.6, and 25 mS exposure time.

Figure 15:
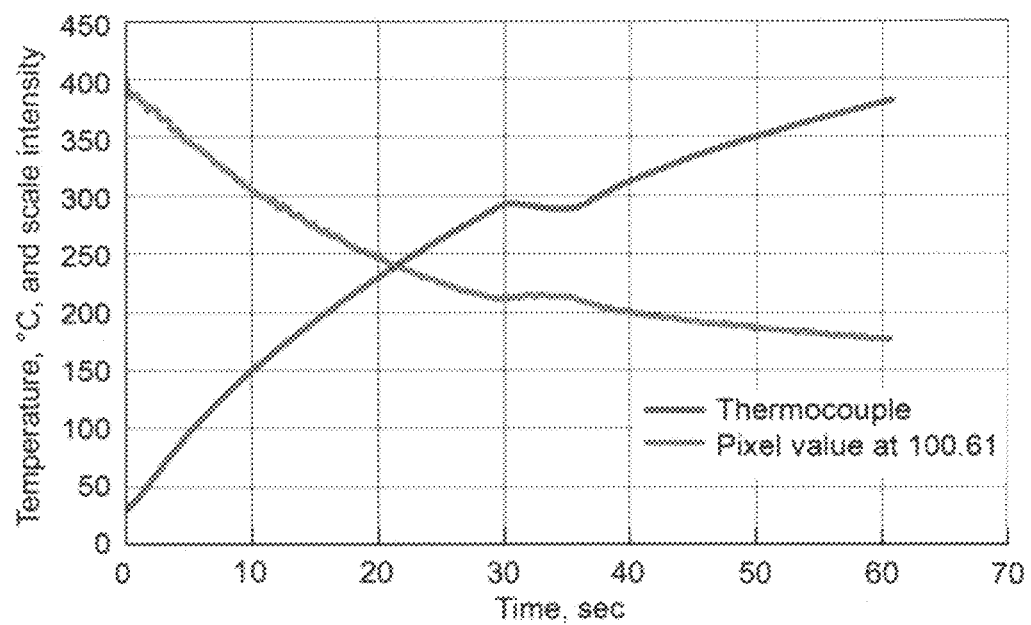
FIG. 15 shows that intensity value corresponds closely to the temperature as measured by the thermocouple.
Figure 16:
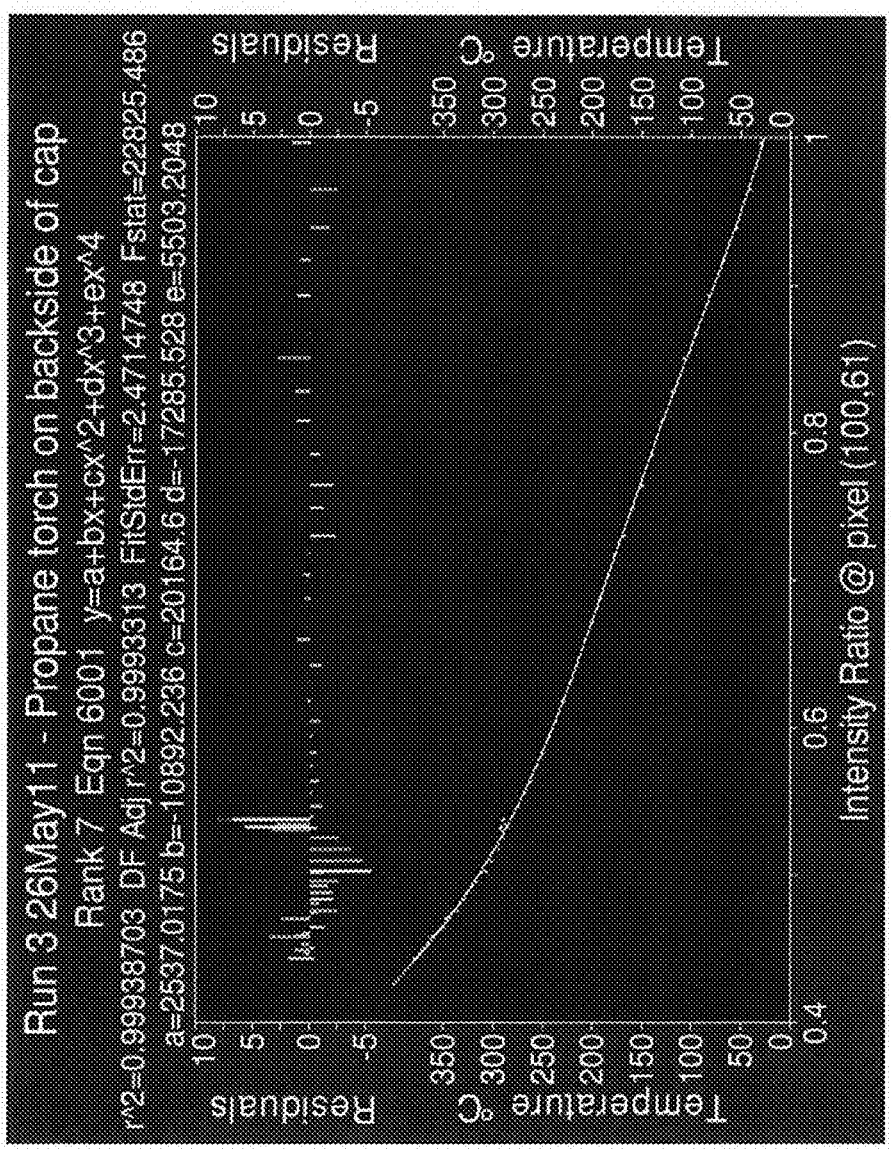
FIG. 16 shows the results of curve fitting of the thermocouple temperature and image intensity ratio information of FIG. 15.

FIG. 15 illustrates a plot of thermocouple data and intensity ratio using the 5 W red-orange LED and the cooled CCD camera data obtained with the setup of FIG. 12. A single pixel value from the camera was used, showing the intensity dependence of the coating and response change to varying the heat source. As explained, measurements obtained using the subject innovation can be correlated with temperatures based on calibration values. As can be seen in FIG. 15, intensity value corresponds closely to the temperature as measured by the thermocouple, indicating that systems and methods of the subject innovation can be used to provide accurate temperature measurements. FIG. 16 shows the results of curve fitting of the thermocouple temperature and image intensity ratio information of FIG. 15.

Figure 17:
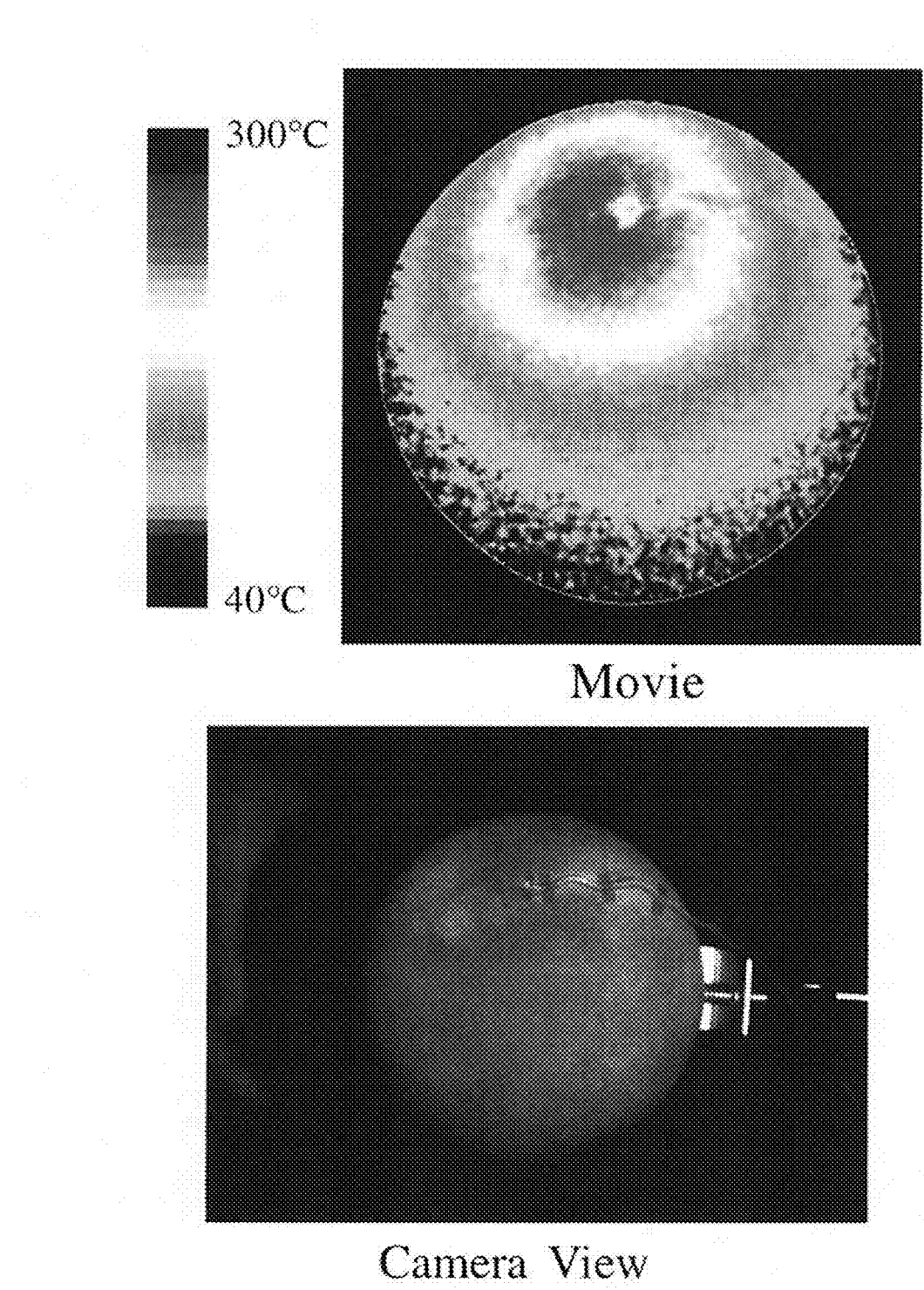
FIG. 17 shows images obtained with the setup of FIG. 12 using a high-speed CMOS camera in both a camera view and a frame from a false colored movie.

FIG. 17 shows images obtained with the setup of FIG. 12 using a high-speed CMOS camera in both a camera view and a frame from a false colored movie. The camera used to obtain these images obtained 12 bit images with a resolution of 640×480 pixels, at a rate of 200 frames per second, with a 225 μS exposure time. The illumination source used was the 5 W red-orange LED.

Figure 18:
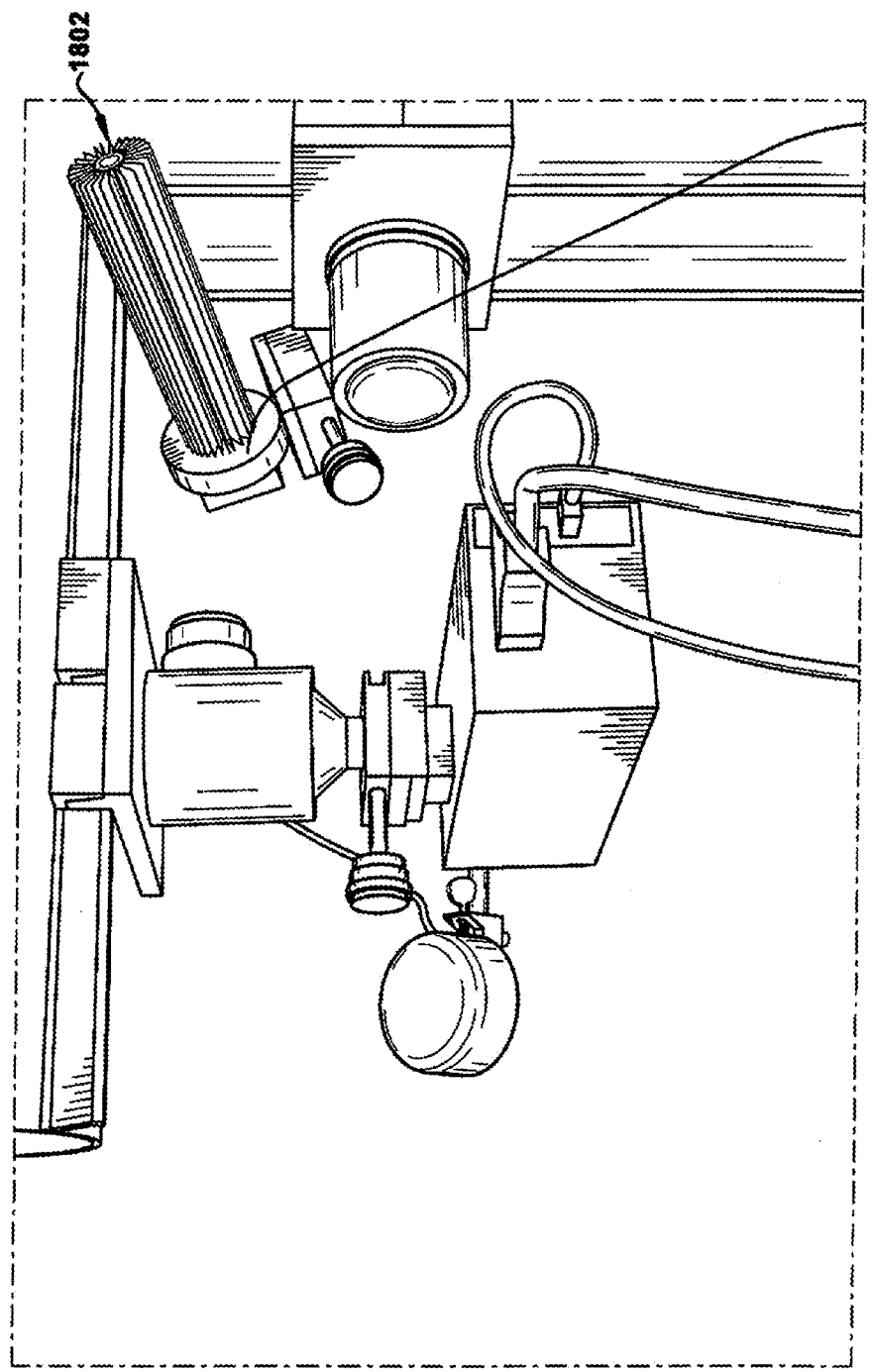
FIG. 18 illustrates a modified setup of that shown in FIG. 12, with data obtained with the sample at an angle to the imaging device.
Figure 19:
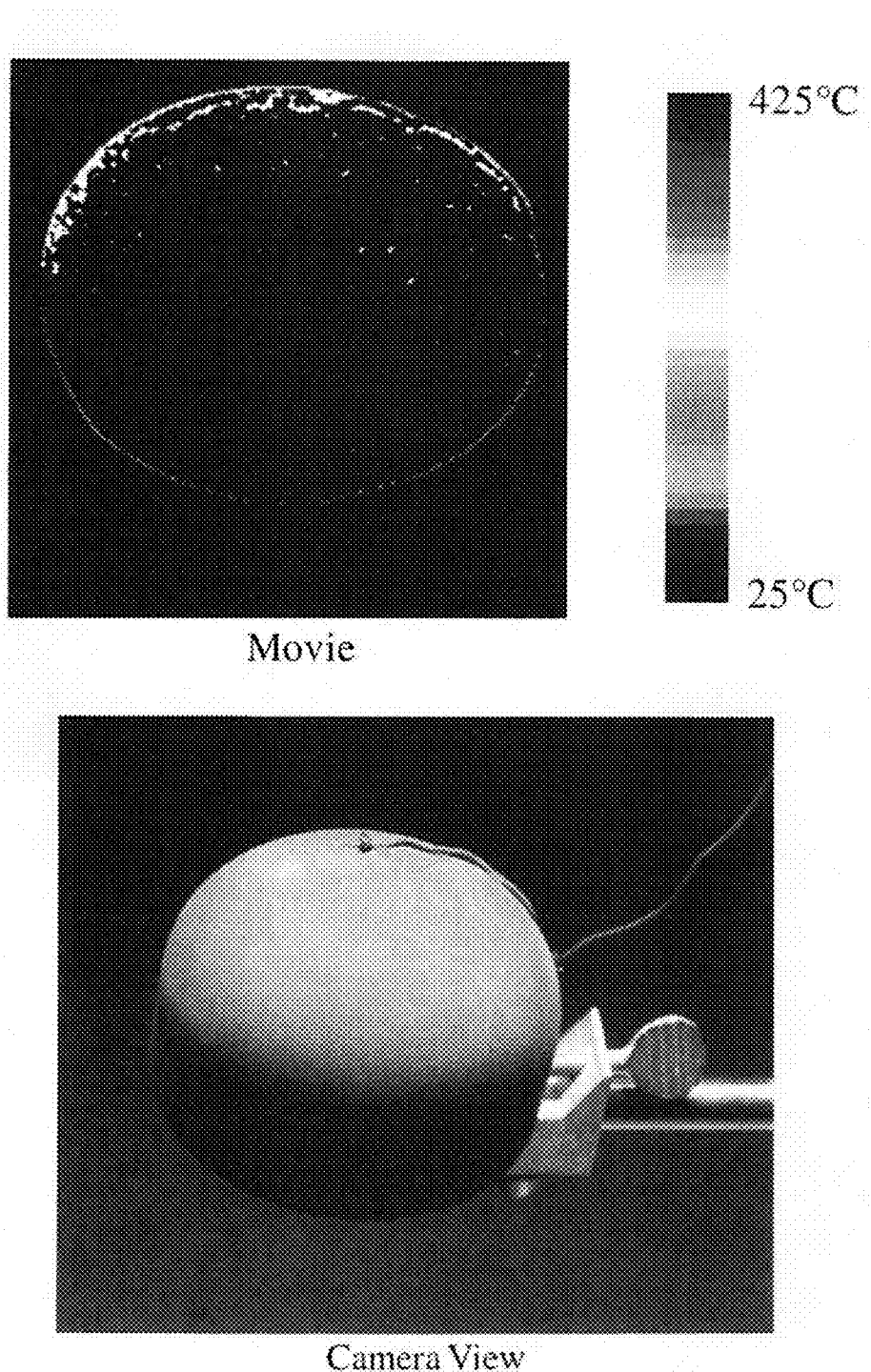
FIG. 19 illustrates images obtained with the sample tilted at approximately a 45° angle from camera normal.

FIG. 18 illustrates a modified setup of that shown in FIG. 12, with data obtained with the cap at an angle to the imaging device and red-orange LED 1802. Results from the setup of FIG. 18 are shown in FIG. 19, which illustrates images obtained with the cap tilted at approximately a 45° angle from camera normal, using the cooled 14 bit CCD camera, type K thermocouple and propane torch to heat the cap.

Systems and methods of the subject innovation allow for a variety of applications, being usable to measure temperature over a wide range, in a variety of settings, including environments that preclude many other forms of temperature measurement. Applications include aerospace applications, particularly high velocity or high temperature applications (e.g., such as in connection with potential space re-entry vehicles, such as inflatable re-entry vehicles, etc.), on aircrafts (including flight testing, or in aircraft engines and exhaust applications, etc.), etc. Additionally, there are numerous industrial and commercial applications, such as in industrial or residential ovens, in connection with industrial heating and curing processes, in residential heating systems including space heaters, etc. Systems and methods of the subject innovation can also be used in automotive applications, such as for thermal measurements in connection with exhaust systems and engines.

In other words, what has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A temperature measurement system, comprising:
   a hematite temperature sensor;
   a measurement component that receives reflected light from the hematite temperature sensor and measures intensity data associated with at least a portion of a spectrum of the reflected light; and
   an analysis component that determines a temperature of the hematite temperature sensor based at least in part on the measured intensity data.

2. The system of claim 1, wherein the analysis component determines the temperature based at least in part on calculating a ratio between the measured intensity data and a reference intensity.

3. The system of claim 1, wherein the analysis component determines the temperature based at least in part on calculating a ratio of a first intensity that corresponds to a first portion of the spectrum of the reflected light with a second intensity that corresponds to a second portion of the spectrum of the reflected light.

4. The system of claim 3, wherein the first portion of the spectrum corresponds to a blue region and the second portion of the spectrum corresponds to a red region.

5. The system of claim 1, wherein the measurement component measures intensity data corresponding to a plurality of regions of the hematite temperature sensor, and wherein the analysis component determines a map of the temperature based at least in part on the intensity data corresponding to the plurality of regions of the hematite temperature sensor.

6. The system of claim 1, further comprising an illumination source that directs incident light toward the hematite temperature sensor, wherein the spectrum of the reflected light is based at least in part on the incident light.

7. The system of claim 1, further comprising a control component that determines whether an environmental light source has an amplitude sufficient for temperature measurement, wherein the measurement component detects the amplitude of the environmental light source.

8. The system of claim 1, wherein the hematite temperature sensor is attached to the end of a fiber optic probe.

9. The system of claim 1, wherein the hematite temperature sensor comprises a refractory binder mixed with hematite particles.

10. The system of claim 9, wherein the hematite particles have a particle size of around 5 μm.

11. A method of measuring temperature, comprising:
    measuring at least a portion of a spectrum of light reflected from a hematite sensor;
    comparing the measured portion of the spectrum to one or more calibration values; and
    calculating a temperature based at least in part on the comparison.

12. The method of claim 11, wherein calculating the temperature comprises calculating a ratio between an intensity of the measured portion of the spectrum and a reference intensity.

13. The method of claim 11, wherein calculating the temperature comprises calculating a ratio of a first intensity that corresponds to a first region of the measured portion of the spectrum with a second intensity that corresponds to a second region of the measured portion of the spectrum.

14. The method of claim 13, wherein the first region corresponds to a blue region and the second region corresponds to a red region.

15. The method of claim 11, wherein measuring at least the portion of the spectrum comprises measuring at least the portion of the spectrum for each of a plurality of regions of the hematite sensor, and wherein calculating the temperature comprises calculating the temperature for each of the plurality of regions.

16. The method of claim 15, further comprising generating a temperature map that represents the temperature for each of the plurality of regions.

17. The method of claim 11, further comprising determining whether an environmental light source has an amplitude sufficient for temperature measurement.

18. The method of claim 17, further comprising illuminating the hematite sensor.

19. A method of producing a temperature sensor, comprising:
    mixing a refractory binder with hematite particles to create a coating;
    applying the coating to a surface; and
    curing the coating by raising the temperature of the coating.

20. The method of claim 19, wherein the hematite particles have a particle size of around 5 μm.

* * * * *